United States Patent
Malhotra et al.

(10) Patent No.: US 9,532,276 B1
(45) Date of Patent: Dec. 27, 2016

(54) HYBRID CALL CONTINUITY FOR A WIRELESS COMMUNICATION DEVICE

(71) Applicant: Sprint Spectrum L.P., Overland Park, KS (US)

(72) Inventors: Rajil Malhotra, Olathe, KS (US); Saravana Velusamy, Olathe, KS (US); Naresh Madineni, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 80 days.

(21) Appl. No.: 14/619,686

(22) Filed: Feb. 11, 2015

(51) Int. Cl.
*H04W 36/00* (2009.01)
*H04W 88/06* (2009.01)
*H04L 29/12* (2006.01)
*H04L 29/06* (2006.01)

(52) U.S. Cl.
CPC ...... *H04W 36/0022* (2013.01); *H04L 61/2007* (2013.01); *H04L 65/1006* (2013.01); *H04L 65/1016* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 9,271,330 B1* | 2/2016 | Malhotra | | H04W 92/02 |
| 2009/0016300 A1* | 1/2009 | Ahmavaara | | H04W 36/0072 370/331 |
| 2010/0135246 A1* | 6/2010 | Hallental | | H04W 36/0022 370/331 |
| 2010/0311386 A1* | 12/2010 | Edge | | H04W 36/0022 455/404.1 |
| 2011/0176511 A1* | 7/2011 | Sayeedi | | H04W 36/0016 370/331 |
| 2011/0200011 A1* | 8/2011 | Rune | | H04W 36/0022 370/331 |
| 2012/0155381 A1* | 6/2012 | Ballantyne | | H04W 52/0274 370/328 |
| 2014/0016618 A1* | 1/2014 | Bae | | H04W 36/0022 370/331 |
| 2014/0079023 A1* | 3/2014 | Lindsay | | H04W 36/0022 370/331 |
| 2014/0098787 A1* | 4/2014 | Kim | | H04W 36/0022 370/331 |
| 2014/0133455 A1* | 5/2014 | Hallenstal | | H04L 65/1016 370/331 |

(Continued)

*Primary Examiner* — Ayaz Sheikh
*Assistant Examiner* — Faiyazkhan Ghafoerkhan (57) ABSTRACT

A wireless communication device (WCD) is configured to receive and maintain concurrently in data storage at least two different IMS transfer-addresses, such as one for use when the WCD's transition between radio access networks (RANs) is a single-radio transition and the other for use when the WCD's transition between RANs is a dual-radio transition, and/or one for use when the WCD's transition between RANs is packet-to-packet and the other for use when the WCD's transition between RANs is packet-to-circuit. Upon transitioning between RANs, the WCD may then select the appropriate one of these IMS transfer-addresses and transmit the selected IMS transfer-address to a network node to facilitate handover of an ongoing call to be via the WCD's new serving RAN.

20 Claims, 4 Drawing Sheets

(56) References Cited

U.S. PATENT DOCUMENTS

| | | | |
|---|---|---|---|
| 2015/0131619 A1* | 5/2015 | Zhu | H04W 36/0022 370/332 |
| 2015/0156680 A1* | 6/2015 | Brombal | H04L 65/80 370/331 |
| 2015/0156681 A1* | 6/2015 | Brombal | H04L 65/80 370/331 |
| 2016/0150446 A1* | 5/2016 | Kallio | H04L 65/1006 370/331 |

* cited by examiner

HYBRID CALL CONTINUITY FOR A WIRELESS COMMUNICATION DEVICE

BACKGROUND

A typical radio access wireless (RAN) network includes a number of base stations, access points, access nodes, or the like, that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the RAN may engage in air interface communication with a base station and may thereby communicate via the base station with various remote network entities or with other WCDs served by the RAN.

In general, a RAN may operate in accordance with a particular radio access technology or "air interface protocol," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communications (GSM), in addition to various Wireless Local Area Network protocols such as the IEEE 802.11 (WiFi) protocols, among others. Each protocol may define its own procedures for registration of WCDs, initiation of communications, handover between coverage areas, and functions related to air interface communication.

RANs such as these may provide connectivity with a communication services platform that facilitates advanced communication services, such as voice over Internet Protocol (VoIP) based call connections and other packet-based real-time media services (e.g., video sessions, etc.) for instance. When a WCD is served by a particular RAN, the WCD may then engage in communication via the RAN with the communication services platform and, via the communication services platform or associated equipment, with various remote entities such as remote call parties. An example of such a platform is an Internet Multimedia System (IMS), which is arranged to facilitate packet-based communications of various forms and which may support WCD access through various RANs or landline access networks. Typically, such an IMS would support industry standard packet-based signaling and bearer communication protocols, such as Session Initiation Protocol (SIP) signaling and Real-time Transport Protocol (RTP) bearer communication for instance.

To facilitate IMS service, once a WCD is registered to be served by a particular RAN, the WCD may then register with the IMS, via the RAN, and/or the RAN may register with the IMS on behalf of the WCD. For instance, if the WCD has an assigned IP address to facilitate wireless packet-data communication, the WCD may then engage in SIP registration signaling with the IMS via the RAN, or the RAN may engage in SIP registration signaling with the IMS on behalf of the WCD. Such registration may trigger authentication of the WCD, reservation of resources in the IMS to serve the WCD, and notification of the IMS where the WCD can be reached for incoming communications, among other functions.

In turn, the WCD and/or the RAN may engage in further signaling with the IMS to set up communications such as VoIP calls or the like between the WCD and remote parties. For instance, if the WCD has an assigned IP address, the WCD may engage in SIP signaling with the IMS via the RAN to place or receive a VoIP call, which may result in setup of a call leg between the IMS and the WCD via the RAN, another call leg between the IMS and a remote party, and an IMS gateway or other node bridging those two call legs together to facilitate communication between the WCD and the remote party. Alternatively, the WCD may engage in signaling communication with its serving RAN to set up a call, and a node of the RAN may in turn engage in signaling communication with the IMS to set up the call via the IMS. Other arrangements are possible as well.

An IMS may also support handover of a communication when a WCD transitions from being served by one RAN to being served by another RAN. For instance, if the WCD has an IP address for packet-data communication via the new RAN, the WCD may engage in SIP signaling with the IMS via the new RAN to re-register via the new RAN and to cause the IMS to establish a replacement call leg with the WCD via the new RAN. Alternatively, if the WCD does not have an IP address for packet-data communication via the new RAN, the WCD may engage in signaling with the new RAN, and the new RAN may then engage in signaling with the IMS to establish a replacement call leg with the WCD via the new RAN.

To facilitate such handover, the IMS may supply the WCD in advance with an IMS transfer-address at the time the WCD registers to be served by the IMS. Such an IMS transfer-address may point to or otherwise identify a node in the IMS that would control communications for the WCD. Thus, when the WCD is engaged in a communication served by the IMS and the WCD transitions to be served by a new RAN, the WCD can send that IMS transfer-address via the new RAN in SIP signaling to the IMS, or the WCD can send that IMS transfer-address to the new RAN and the new RAN can send the IMS transfer-address to the IMS, so that the IMS node that controls communications for the WCD can appropriately extend the ongoing communication to the WCD via the new RAN.

OVERVIEW

Optimally, the IMS transfer-address that the WCD receives when registering with the IMS via a RAN will work as noted above to facilitate handover of a communication when the WCD then transitions to be served by a new RAN. A problem that can arise in practice, however, is that, when the WCD registers with the IMS via a new RAN, the WCD may receive from the IMS a new IMS transfer-address that is different from the IMS transfer-address that the WCD received upon registration with its old RAN, and the WCD may store the new IMS transfer-address in place of its old IMS transfer-address. When the WCD then engages in signaling to facilitate handover of the ongoing communication to be via the new RAN, the handover of the communication may then fail, as the new IMS transfer-address that the WCD provides in that process may not point to the IMS node that was handling the communication.

The genesis of this problem may be that some WCDs are configured to support either "single radio voice call continuity" (SRVCC) or "dual radio voice call continuity"

(DRVCC) but not both. SRVCC involves the WCD using a single radio (e.g., just one transmitter) as the WCD transitions from one RAN to another, typically breaking its connection with one RAN before establishing its connection with a new RAN. Whereas DRVCC involves the WCD using two radios (e.g., two transmitters) as the WCD transitions from one RAN to another, thus maintaining greater continuity by being able to establish its connection with the new RAN before breaking its connection with the old RAN.

When an SRVCC-capable WCD registers with the IMS, the WCD may include in its registration signaling an indication that it is SRVCC capable. In response to that indication, the IMS may provide the WCD with an IMS transfer-address in the form of a session transfer number (STN-SR) that points to an IMS access transfer control function (ATCF) that controls an access transfer gateway (ATGW) through which IMS-based communications will then be set up for the WCD. This STN-SR may facilitate single-radio transition of the WCD during an IMS-based call. In particular, when the WCD then transitions during such a call to be served by a new RAN, the WCD may transmit to the new RAN the STN-SR, and the new RAN may engage in SIP signaling directed to the STN-SR, and thus to the ATCF, to arrange for bridging of the call between the ATGW and the new RAN and thus via the new RAN to the WCD.

A good example of this SRVCC scenario arises where the initial serving RAN is an LTE RAN and the new RAN is a 3G RAN such as a CDMA RAN for instance, and where the WCD has a single radio that can be switched between LTE and 3G communications. In that scenario, the WCD may initially register with the IMS via the LTE RAN by transmitting a SIP REGISTER message that indicates the WCD is SRVCC capable. In response, the IMS may then transmit to the WCD a SIP 200 OK message that carries in a Feature Capabilities (FCAP) header an STN-SR that points to an ATCF that controls an ATGW through which IMS-based communications will be set up for the WCD. Thereafter, during such an IMS-based communication, if the WCD transitions from being served by the LTE RAN to being served by a 3G RAN, the WCD may then transmit to the 3G RAN an origination message that carries the STN-SR, and a switch or other node in the 3G RAN may responsively transmit a SIP INVITE directed to that STN-SR, and thus to the ATCF, so as to trigger setup of a bridge between the ATGW and the 3G RAN and thus extension of the communication via the 3G RAN to the WCD.

On the other hand, when a DRVCC-capable WCD registers with the IMS, the WCD may provide no indication of DRVCC support, but the IMS may determine from reference to a WCD profile that the WCD supports DRVCC. Consequently, the IMS may provide the WCD with an IMS transfer-address in the form of a voice call continuity domain transfer number (VDN) that points to a session continuity call application server (SCCAS) that controls session connections for the WCD possibly via a different ATGW. This VDN may facilitate dual-radio transition of the WCD during an IMS-based call. In particular, when the WCD then transitions during such a call to be served by a new RAN, the WCD may transmit via the new RAN (or via the old RAN for that matter) to the IMS a SIP RE-INVITE message specifying the VDN, and that RE-INVITE message would pass to the associated SCCAS. The SCCAS may then responsively renegotiate a leg of the call with the WCD via the new RAN (and perhaps renegotiate a leg of the call with the other call party), to allow the call to continue with the WCD via the new RAN.

A good example of this DRVCC scenario arises where the initial serving RAN is a WiFi RAN and where the new RAN is an LTE RAN (or vice versa) and where the WCD has two radios, one for WiFi communication and the other for LTE communication. In that scenario, the WCD may initially register with the IMS via the WiFi RAN by transmitting a SIP REGISTER message, and the IMS may determine from a profile record of the WCD that the WCD is DRVCC capable. In response, the IMS may then transmit to the WCD a SIP 200 OK message that carries in an FCAP header a VDN that points to an SCCAS that controls session communications for the WCD. Thereafter, during such an IMS-based communication, if the WCD transitions from being served by the WiFi RAN to being served by an LTE RAN, the WCD may then transmit via the LTE RAN (or perhaps via the WiFi RAN) a SIP RE-INVITE message directed to the VDN, and thus to the SCCAS. Upon receipt of that RE-INVITE message, the SCCAS may then set up a replacement leg for the call with the WCD via the LTE RAN (and perhaps a replacement leg of the call with the other call party), to allow the call to continue via the LTE RAN. A similar process can happen if such a WCD transitions from LTE to WiFi.

If a WCD is configured to support SRVCC or is configured to support DRVCC, there may be little if any problem as the WCD transitions between RANs as in the scenarios just described. However, the above-noted difficulty with IMS transfer-addresses could arise if a WCD is configured to support both SRVCC and DRVCC (e.g., to be able to transition both between LTE and 3G and between WiFi and LTE). In particular, whenever such a hybrid WCD registers with the IMS through a RAN from which the WCD could engage in SRVCC transition, the WCD may receive from the IMS an STN-SR. But whenever the WCD registers with the IMS through a RAN from which the WCD could engage in DRVCC transition, the WCD may receive from the IMS a VDN. The problem with this is that if the WCD has received one of these values and then, upon registration via a new RAN, receives the other of these values, the WCD may treat the newly received value as a replacement for the earlier value, thus preventing the WCD from using the earlier value to facilitate call handover.

As an example of this problem, consider a scenario where a WCD initially registered with the IMS via a WiFi RAN and, to facilitate possible DRVCC transition from WiFi to LTE, received from the IMS, in an FCAP header of a SIP 200 OK message, a VDN pointing to an SCCAS that will control IMS sessions for the WCD, and the WCD stored that VDN as its IMS transfer-address for later use. Subsequently, while the WCD is then engaged in a VoIP call or other IMS-based communication via the WiFi RAN, assume that the WCD transitions from being served by the WiFi RAN to being served by an LTE RAN.

In this scenario, once the WCD registers with the LTE RAN, the WCD may then re-register with the IMS via the LTE RAN, including in its SIP REGISTER message an indication of its SRVCC capability. Given the WCD's SRVCC capability, the IMS may then provide to the WCD, in an FCAP header of a SIP 200 OK message, an STN-SR pointing to an ATCF that controls an ATGW through which IMS-based communications will be set up for the WCD. Because this value comes to the WCD as a new FCAP header value, the WCD may treat it as a replacement for the FCAP header value that the WCD previously received (namely, the VDN), thus storing the STN-SR as its current IMS transfer-address, in place of the VDN.

Once the WCD has so registered with the IMS via the LTE RAN, the WCD may then seek to hand over its existing VoIP call from being via the WiFi RAN to being via the LTE RAN. To do so, as noted above, the WCD may transmit a SIP RE-INVITE message directed to the WCD's currently stored IMS transfer-address. Unfortunately, however, because the WCD overwrote its VDN with the STN-SR that the WCD received upon registration via the LTE RAN, this SIP RE-INVITE message will get routed to the ATCF rather than to the SCCAS, and the ATCF would be unable to process the RE-INVITE. Consequently, handover of the call to be via the LTE network would fail.

Disclosed herein is a method and system to help avoid this type of problem. In accordance with the disclosure, a WCD will be configured to receive and maintain concurrently in data storage two different IMS transfer-addresses, one for use when the WCD's transition between RANs is a single-radio transition and the other for use when the WCD's transition between RANs is a dual-radio transition. Upon transitioning between RANs, the WCD may then select the appropriate one of these IMS transfer-addresses and transmit the selected IMS transfer-address to a network node to facilitate handover of an ongoing call to be via the WCD's new serving RAN.

In one respect, for instance, disclosed is a method for hybrid call continuity in a WCD, where the WCD has a first radio and a second radio. In accordance with the disclosure, the method may involve the WCD engaging in a call served by an IMS via a first RAN that serves the WCD and that provides connectivity between the WCD and the IMS. Further, the method may involve, during the call, the WCD transitioning from being served by the first RAN to being served by a second RAN, where the transitioning is either (i) dual-radio, in which the WCD switches from using the first radio to be served by the first RAN to using the second radio to be served by the second RAN or (ii) single-radio in which the WCD switches from using the first radio to be served by the first RAN to using the first radio to instead be served by the second RAN. And the method may involve, in response to the transitioning, the WCD selecting one of at least two IMS transfer-addresses, and the WCD sending the selected IMS transfer-address to a network node to trigger IMS transfer of the call from being connected with the WCD via the first RAN to being connected with the WCD via the second RAN, where the selecting is based on whether the transitioning is dual-radio or rather single-radio.

In another example, the method may involve the WCD receiving from an IMS at least two IMS transfer-addresses, and the WCD storing the at least two received IMS transfer-addresses concurrently in data storage. Further, the method may involve, while the WCD is engaged in a call served by the IMS, the WCD transitioning from being served by a first RAN that provides connectivity between the WCD and the IMS to being served by a second RAN that provides connectivity between the WCD and the IMS. And still further, the method may involve, responsive to the transitioning, (i) the WCD selecting one of the two stored IMS transfer-addresses, and (ii) the WCD sending the selected IMS transfer-address to a network node to trigger IMS transfer of the call from being connected with the WCD via the first RAN to being connected with the WCD via the second RAN.

And in still another respect, disclosed is a WCD that supports hybrid call continuity. As disclosed, such a WCD may include a wireless communication interface comprising a first radio and a second radio, data storage, and a controller. The controller may be configured to receive from an IMS two IMS transfer-addresses including a DRVCC transfer address and an SRVCC transfer address, and to store the received IMS transfer-addresses in the data storage. Further, the controller may be configured to carry out hybrid call continuity operations such as those noted above while the WCD is engaged in a call served by the IMS. By way of example, the operations may comprise (i) detecting transitioning of the WCD from being served by a first RAN that provides connectivity between the WCD and the IMS to being served by a second RAN that provides connectivity between the WCD and the IMS, and (ii) responsive to the detecting, selecting one of the stored IMS transfer-addresses and sending the selected IMS transfer-address via the wireless communication interface to a network node to trigger IMS transfer of the call from being connected with the WCD via the first RAN to being connected with the WCD via the second RAN. Further, in line with the discussion above, the selecting may be based on whether the transitioning is dual-radio or is rather single-radio, as described above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure focuses by way of example on a network arrangement including WiFi, LTE, and 3G (e.g., CDMA) RANs, and on an example IMS arrangement. It will be understood that the specifics shown and described, however, are only intended to be examples, and that numerous variations are possible. For instance, the principles discussed can be applied in an arrangement involving other sorts of RANs or variations on the RANs described, other IMS configurations, other types of WCDs, and with various other changes.

Referring to the drawings, as noted above, FIG. 1 is a simplified block diagram depicting an example arrangement in which principles of the present disclosure can be implemented. As shown, the example arrangement includes a representative WCD 12 having at least two radios 14, 16. In the example arrangement, radio 14 is configured to support WiFi service, and radio 16 is configured to support LTE and CDMA service. As further shown, the example arrangement then includes a representative WiFi RAN 18, a representative LTE RAN 20, and a representative CDMA RAN 22. Although the figure shows the WCD 12 being in wireless communication with all three RANs, in practice the WCD may not be in communication with all three RANs at the same time but may transition from being in better coverage of one RAN to being in better coverage of another RAN, and the like. Those of ordinary skill in the art are familiar with the basic configuration and operation these RANs, so the details of the RANs are not described here.

Figure 1:
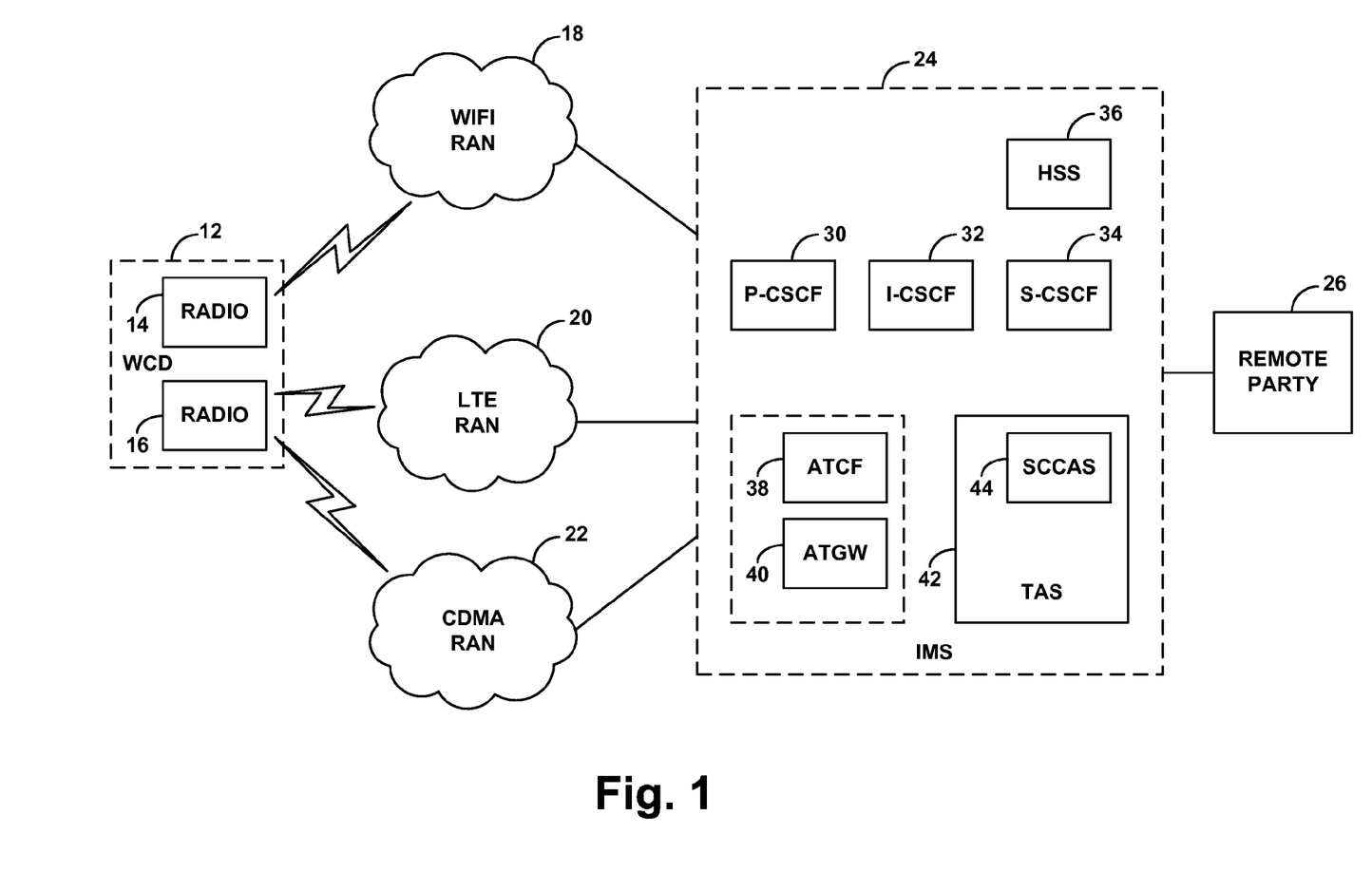
FIG. 1 is a simplified block diagram of a example arrangement in which principles of the present disclosure can be implemented.

As further shown, the example arrangement includes a representative IMS 24, with each the three RANs providing connectivity with the IMS 24, and the IMS having a communication connection in turn with a representative remote party 26. With this arrangement, as discussed above, when the WCD is served by one of the RANs, the WCD may be registered via the RAN with the IMS and may engage in an IMS-based communication with remote party 26.

The representative IMS is shown including various components. For instance, the IMS includes a proxy call session control function (P-CSCF) 30, an interrogating CSCF (I-CSCF) 32, a serving CSCF (S-CSCF) 34, a home subscriber server (HSS) 36, an ATCF 38 and ATGW 40, and a telephone application server (TAS) 42 including an SCCAS 44. In practice, various ones of these components can be co-located with each other, provided as separate functions on a particular server or other equipment. For instance, the P-CSCF, ATCF, and ATGW may be co-located with each other in a session border controller (SBC) (not depicted).

With this arrangement, as discussed above, when the WCD connects with a particular RAN that supports wireless packet-data service, such as with the WiFi RAN or the LTE RAN for instance, the WCD may then register via that RAN with the IMS, by sending a SIP REGISTER message to the P-CSCF, which may pass the SIP REGISTER message to the I-CSCF. The I-CSCF may then dip into the HSS to determine an S-CSCF to serve the WCD, and the I-CSCF would pass the SIP REGISTER message to that S-CSCF. The S-CSCF may then dip into the HSS to obtain a profile record for the WCD, and the S-CSCF may respond with a SIP 200 OK message, which may pass to the I-CSCF, to the P-CSCF, and on to the WCD.

In turn, a WCD that is registered with the IMS via a RAN may begin a VoIP call or other IMS-based communication via that RAN, through SIP signaling with the IMS. For instance, the WCD may originate a VoIP call to remote party 26 by transmitting to the P-CSCF a SIP INVITE including a SIP telephone number associated with the remote party. That SIP INVITE may then pass via the ATCF logically co-located with the P-CSCF to the WCD's S-CSCF and in turn to the TAS. The TAS may then engage in third party call control to set up the call including a call leg between the WCD and the ATGW and a call leg between the ATGW and the remote party. Further, additional SIP signaling may pass between the IMS and the WCD in this call setup process. Likewise, if the IMS receives a request to connect a call to the WCD, the IMS may transmit to the WCD via its serving RAN a SIP INVITE and may similarly work to set up the call.

As noted above, when the representative WCD registers with the IMS via RAN from which the WCD could engage in a single-radio transition to another RAN, the WCD may include in its SIP REGISTER message an indication of the device's SRVCC capability. For instance, when the WCD is registering with the IMS via the LTE RAN (from which the WCD could engage in single-radio transition to the CDMA RAN), the WCD may include such an indication in its SIP REGISTER message. In response to that indication, the P-CSCF may then add into the SIP 200 OK message being transmitted to the WCD (in response to the SIP REGISTER message), in an FCAP header, an STN-SR that points to the ATCF logically co-located with the P-CSCF. And the WCD may store that STN-SR as an IMS transfer-address for use in SRVCC transitions.

In turn, during a VoIP call or other IMS-based communication in which the WCD is engaged, the WCD may engage in an SRVCC process. For instance, during the communication, the WCD may engage in a single-radio transition from being served by the LTE RAN to being served by the CDMA RAN as the WCD begins to lose LTE coverage and transition into CDMA coverage (e.g., with the LTE RAN directing the WCD to transition to CDMA service). The WCD may thus register with the CDMA RAN if it is not yet so registered. And the WCD may transmit to the CDMA RAN an origination request carrying the WCD's STN-SR. This origination request with STN-SR may then be received by a mobile switching center (MSC) of the CDMA RAN, which may then respond to the STN-SR by sending a SIP INVITE directed to that STN-SR (i.e., to the ATCF), to trigger set up of a bridge between the ATCF and the MSC. Once that bridge is set up, the ATCF may then send a notification message (e.g., a SIP INVITE) via the S-CSCF to the TAS, to notify the SCCAS that the call is now continuing via the bridge with the CDMA RAN.

On the other hand, as noted above, when the WCD registers with the IMS via RAN from which the WCD could engage in a dual-radio transition (e.g., perhaps if no single-radio transition is possible, or in any event), such as when the WCD registers via the WiFi RAN or the LTE RAN, the S-CSCF may receive in the WCD's service profile from the HSS a VDN, which points to the SCCAS of the TAS (perhaps a specific SCCAS that will handle DRVCC transitions). And the S-CSCF will include that VDN in an FCAP header of the SIP 200 OK that the S-CSCF sends in response, which may pass in turn via the I-CSCF and P-CSCF to the WCD. And the WCD may store that VDN as an IMS transfer-address for use in DRVCC transitions.

In turn, during a VoIP call or other IMS-based communication in which the WCD is engaged, the WCD may engage in a DRVCC process. For instance, during the communication, the WCD may engage in a dual-radio transition from being served by the WiFi RAN to being served by the LTE RAN as the WCD begins to lose WiFi coverage and transition into LTE coverage. The WCD may thus register with the LTE RAN if it is not yet so registered. And the WCD may then transmit to the IMS via the LTE RAN (or perhaps via the WiFi RAN if possible) a SIP RE-INVITE carrying the WCD's VDN (e.g., with the VDN as a destination SIP address for the RE-INVITE message), and that RE-INVITE message may be routed ultimately to the S-CSCF and in turn to the SCCAS of the TAS. The SCCAS may the responsively renegotiate the call leg with the WCD to be via the LTE RAN (and perhaps negotiate the call leg with the remote party as well, perhaps due to a change in supported codecs as a result of the WCD now being served via LTE). The call may then continue via the LTE RAN.

In line with the discussion above, to support both SRVCC and SRVCC, the WCD may receive and store both a STN-SR and a VDN and operate to select and send one of those IMS transfer-addresses as appropriate, rather than letting one overwrite the other.

In practice, the WCD may receive both of these IMS transfer-addresses together at the same time from the IMS. For instance, when the WCD registers with the IMS (e.g., via LTE, or perhaps via any RAN), the WCD may include in its registration signaling an indication that it is SRVCC capable. Further, upon receipt of the WCD's registration singling, the IMS may determine from the WCD's profile record that the WCD is DRVCC capable. In response to the WCD being both SRVCC capable and DRVCC capable, the IMS may then include in its 200 OK message to the WCD both (i) an STN-SR pointing to the ATCF that controls the ATGW through which IMS sessions for the WCD would be set up and (ii) a VDN pointing to an SCCAS that controls IMS sessions for the WCD, and the IMS may include data that correlates the STN-SR with SRVCC operation and that correlates the VDN with DRVCC operation. The WCD may then store both of the IMS transfer-addresses so provided, keeping track of which is for single-radio transitions and which is for dual-radio transitions, for later reference and use as appropriate.

In turn, if the WCD then engages in a single-radio transition between RANs, the WCD may determine that the transition is a single-radio transition and, in response to that determination, select the STN-SR to send in a message (e.g., to its new serving RAN) to facilitate the SRVCC process. Whereas, if the WCD then engages in a dual-radio transition between RANs, the WCD may determine that the transition is a dual-radio transition and, in response to that determination, select the VDN to send in a message (e.g., to the IMS) to facilitate the DRVCC process.

As a specific example of this, if the WCD engages in IMS registration via the LTE RAN, the P-CSCF could provide the WCD with both a VDN to facilitate DRVCC transition the WiFi RAN and an STN-SR to facilitate SRVCC transition to the CDMA RAN, and the WCD may store those IMS transfer-addresses concurrently in data storage, perhaps with an indication that the STN-SR corresponds with transition to CDMA (as an example of a single-radio transition) and that the VDN corresponds with transition to WiFi (as an example of a dual-radio transition). The WCD may then select and send one of those IMS transfer-addresses later in line with the discussion above.

Alternatively, the WCD could receive these IMS transfer-transfer addresses separately. For example, when the WCD initially registers with the IMS via a RAN from which the WCD would typically engage in a DRVCC transition, the IMS may provide the WCD with a VDN, and the WCD may store that VDN as an IMS transfer-address to use for a DRVCC transition. In turn (or in the reverse order), when the WCD registers with the IMS via a RAN from which the WCD would typically engage in an SRVCC transition, the IMS may provide the WCD with an STN-SR, and the WCD may store that STN-SR as an IMS transfer-address to use for an SRVCC transition, but would not overwrite the VDN with the STN-SR. The WCD may then later select and send the appropriate one of these IMS transfer-addresses to facilitate either DRVCC or SRVCC transition.

As a specific example of this, if the WCD engages in IMS registration initially via the WiFi RAN, the P-CSCF could provide the WCD with a VDN to facilitate DRVCC transition, and the WCD could store the VDN as an IMS transfer-address, for use with dual-radio transitions such as a transition from WiFi to LTE. In turn, while the WCD is engaged in a VoIP call or other IMS-based communication, the WCD may transition from being served by the WiFi RAN to being served by the LTE RAN. After registering with the LTE RAN, the WCD may then register via the LTE RAN with the IMS, and the IMS may provide the WCD with an STN-SR to facilitate SRVCC transition. Rather than overwriting the VDN with the STN-SR, however, the WCD may then store the STN-SR as another IMS transfer-address, for use with single-radio transitions such as a transition from LTE to CDMA.

Advantageously, by storing both the STN-SR and VDN rather than overwriting the VDN with the STN-SR, the WCD would thereby maintain the VDN to be used with dual-radio transitions. As the WCD has just engaged in such a dual-radio transition from the WiFi RAN to the LTE RAN, the WCD may thus send the VDN to the IMS to facilitate handover of the ongoing communication from being via the WiFi RAN to being via the LTE RAN. Further, if the WCD then moves back from LTE to WiFi, the WCD could again use the stored VDN. Alternatively, if the WCD moves from LTE to CDMA, the WCD could use the stored STN-SR as discussed above.

Figure 2:
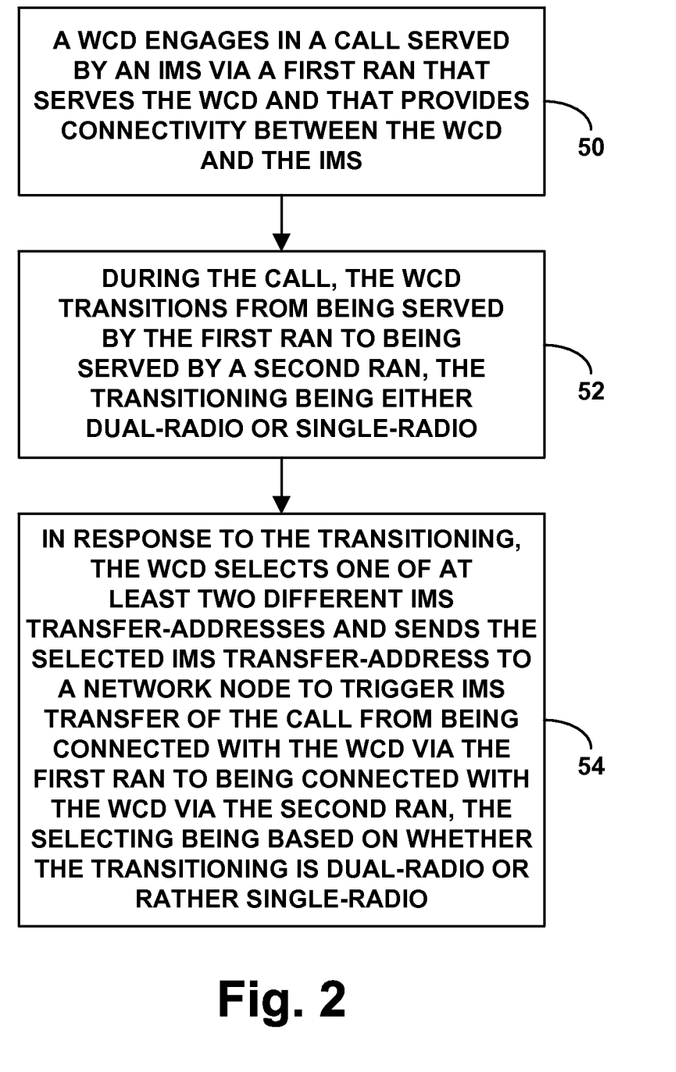
FIG. 2 is a flow chart depicting operations that can be carried out in accordance with the disclosure.

FIG. 2 is a flow chart depicting example operations that can be carried out in accordance with this disclosure, to facilitate hybrid call continuity in a WCD that has at least a first radio and a second radio. As shown in FIG. 2, at block 50, the WCD engages in a call (i.e., any communication, such as but not limited to a voice call) served by an IMS via a first RAN (e.g., an OFDMA RAN) that serves the WCD and that provides connectivity between the WCD and the IMS. At block 52, during the call, the WCD transitions from being served by the first RAN to being served by a second RAN (e.g., a CDMA RAN, a GSM RAN, or a WiFi RAN), the transitioning being either (i) dual-radio, in which the WCD switches from using the first radio to be served by the first RAN to using the second radio to be served by the second RAN or (ii) single-radio in which the WCD switches from using the first radio to be served by the first RAN to using the first radio to instead be served by the second RAN. And at block 54, in response to the transitioning, the WCD selects one of at least two different IMS transfer-addresses and sends the selected IMS transfer-address to a network node to trigger IMS transfer of the call from being connected with the WCD via the first RAN to being connected with the WCD via the second RAN, the selecting being based on whether the transitioning is dual-radio or rather single-radio.

In line with the discussion above, the at least two IMS transfer-addresses may comprise a first IMS transfer-address (e.g., an STN-SR) and a second IMS transfer-address (e.g., a VDN). Further, the WCD may receive one of the IMS transfer-addresses in the course of the WCD registering with the IMS via the first RAN and may receive the other IMS transfer-address in the course of the WCD registering with the IMS via a RAN other than the first RAN, such as with the second RAN for instance. Alternatively, the WCD may receive both IMS transfer-addresses in the course of registering with the IMS via the first RAN. The WCD may maintain both the received first IMS transfer-address and the second received IMS transfer-address concurrently in data storage to facilitate the selecting and sending.

Further, the WCD may correlate the first IMS transfer-address with dual-radio transitioning and may correlate the second IMS transfer-address with single-radio transitioning, to facilitate the selecting and sending. As discussed above, then, if the transitioning is dual-radio, then the act of sending the selected IMS transfer-address to the network node to trigger the IMS transfer of the call from being connected with the WCD via the first RAN to being connected with the WCD via the second RAN may involve sending the selected IMS transfer-address in a SIP RE-INVITE message via the second RAN to an IMS node, so that the SIP RE-INVITE message carrying the selected IMS transfer-address would trigger IMS setup of a new leg of the call with the WCD via the second RAN. Whereas, if the transmitting is single-radio, then the act of sending the selected IMS transfer-address to the network node to trigger the IMS transfer of the call from being connected with the WCD via the first RAN to being connected with the WCD via the second RAN may involve sending the selected IMS transfer-address in an origination message to a switching center of the second RAN, so that the origination message carrying the selected IMS transfer-address triggers bridging of the call between the IMS and the second RAN.

In theory, there could be one or more additional transfer addresses to facilitate still other types of transitions in line with this disclosure, and the WCD could store the additional IMS transfer-address(es) concurrently as well, with appropriate correlations to types of transitions, for later use.

Figure 3:
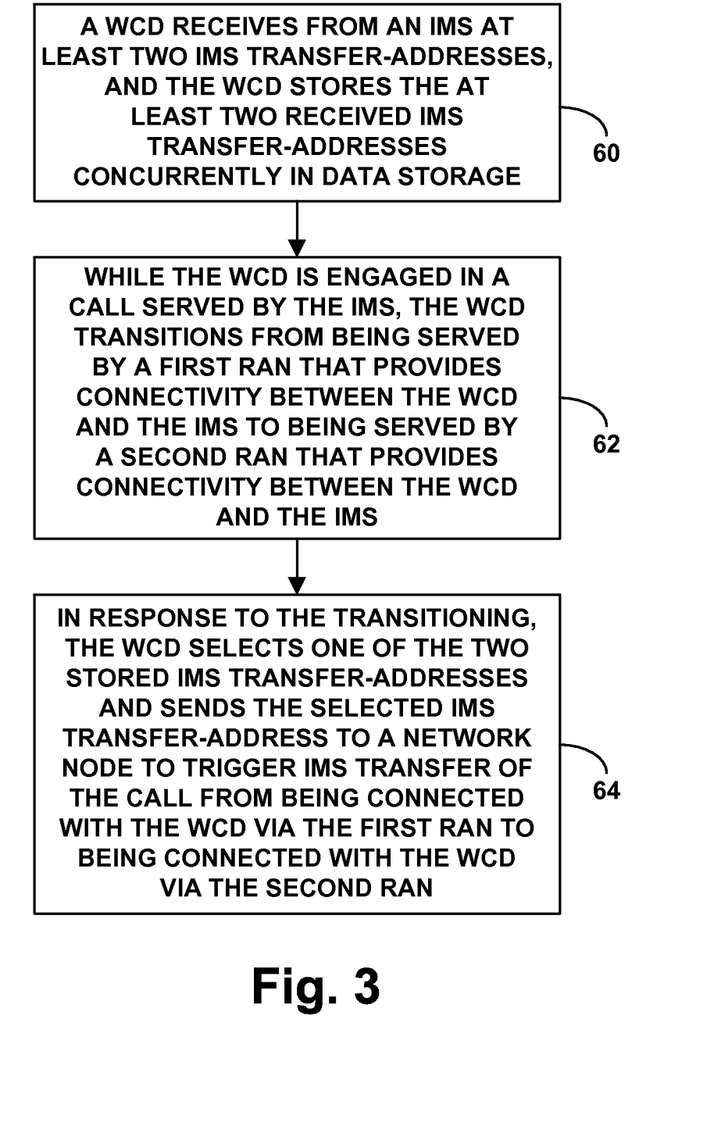
FIG. 3 is another flow chart depicting operations that can be carried out in accordance with the disclosure.

FIG. 3 is next another flow chart depicting operations that can be carried out in accordance with the present disclosure, to facilitate hybrid call continuity in a WCD. As shown in FIG. 3, at block 60, the WCD receives from an IMS at least two IMS transfer-addresses, and the WCD stores the at least two received IMS transfer-addresses concurrently in data storage. At block 62, while the WCD is engaged in a call served by the IMS, the WCD transitions from being served by a first RAN that provides connectivity between the WCD and the IMS to being served by a second RAN that provides connectivity between the WCD and the IMS. And at block 64, in response to the transitioning (e.g., upon transitioning, after registering with the second RAN), the WCD selects one of the two stored IMS transfer-addresses and sends the selected IMS transfer-address to a network node to trigger IMS transfer of the call from being connected with the WCD via the first RAN to being connected with the WCD via the second RAN. Various aspects described above in connection with the method depicted by FIG. 2 can be applied here as well.

Figure 4:
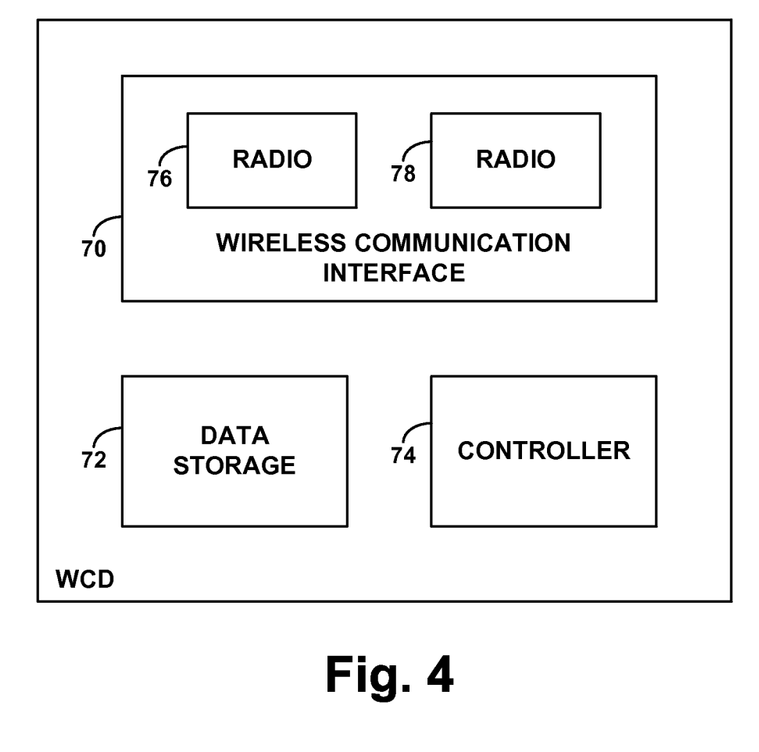
FIG. 4 is a simplified block diagram of an example WCD operable in accordance with the disclosure.

Finally, FIG. 4 is a simplified block diagram of a WCD that supports hybrid call continuity. As shown in FIG. 4, the example WCD includes a wireless communication interface 70, data storage 72, and a controller 74, which may be integrated together in various ways, such as on common chipsets for instance.

As further shown, the wireless communication interface 70 may include multiple radios, each of which may have a respective transmitter, such as a first radio 76 configured for WiFi service, and a second radio 78 configured for LTE and CDMA service for instance. The data storage may then comprise one or more volatile and/or non-volatile storage components, such as magnetic, optical, or flash storage for instance.

Controller 74 may then take various forms, including various combinations of hardware, firmware, and/or software (e.g., a processing unit, non-transitory data storage (possibly data storage 72), and program instructions stored in the data storage and executable by the processing unit) to cause the WCD to carry out various functions described herein, and may be integrated with one or more other WCD components.

In practice, for instance, the controller may be configured to receive from an IMS two IMS transfer-addresses including a DRVCC transfer address and an SRVCC transfer address, and to store the received IMS transfer-addresses in the data storage. Further, the controller may be configured to carry out hybrid call continuity operations while the WCD is engaged in a call served by the IMS, the operations including (i) detecting transitioning of the WCD from being served by a first RAN that provides connectivity between the WCD and the IMS to being served by a second RAN that provides connectivity between the WCD and the IMS, and (ii) responsive to the detecting, selecting one of the stored IMS transfer-addresses and sending the selected IMS transfer-address via the wireless communication interface to a network node to trigger IMS transfer of the call from being connected with the WCD via the first RAN to being connected with the WCD via the second RAN. Further, the selecting may be based on whether the transitioning is dual-radio or is rather single-radio. In addition, other aspects discussed above can apply in this context as well.

Note also that, although this disclosure has focused on the IMS transfer-addresses being for use in connection with dual-radio or single-radio transitions and being selected based on whether the transition is dual-radio or rather single-radio, the present disclosure could extend as well to provide for having a WCD store multiple IMS transfer-addresses for use on other bases instead or in addition.

For example, considering the scenarios discussed above, the STN-SR could be deemed appropriate for use in a scenario involving a transition from RAN providing packet-data service (where a WCD has an IP address with which to engage in communication with the IMS) to a RAN providing circuit-data service (where a WCD does not have an IP address with which to engage in communication with the IMS), such as between LTE and WiFi. And the VDN could be deemed appropriate for use in a scenario involving a transition from a RAN providing packet-data service to another RAN providing packet-data service, such as from LTE to CDMA or GSM.

The principles discussed above can largely still apply with this alternative implementation. For instance, when the WCD itself engages in wireless packet-data communication via its RAN to register with the IMS, the IMS may provide to the WCD both an STN-SR and a VDN, or the IMS could provide the WCD with an STN-SR if the WCD would transition from its serving RAN to a circuit-based RAN or a VDN if the WCD would transition from its serving RAN to another packet-based RAN. The WCD could then store both the STN-SR and VDN, correlating the STN-SR with packet-to-circuit transitions and the VDN with packet-to-packet transitions. And the WCD may select the one of those stored IMS transfer-addresses based on whether the WCD's RAN transition is packet-to-circuit or rather packet-to-circuit. Namely, if the WCD's transition is packet-to-circuit, then the WCD may select the STN-SR, whereas if the WCD's transition is packet-to-packet, then the WCD may select the VDN. Other examples are possible as well.

Exemplary embodiments have been described above. Those skilled in the art will understand, however, that changes and modifications may be made to these embodiments without departing from the true scope and spirit of the invention.

We claim:

1. A method for hybrid call continuity in a wireless communication device (WCD), wherein the WCD has a first radio and a second radio, the method comprising:
   engaging by the WCD in a call served by an Internet Multimedia Subsystem (IMS) via a first radio access network (RAN) that serves the WCD and that provides connectivity between the WCD and the IMS;
   during the call, transitioning by the WCD from being served by the first RAN to being served by a second RAN, wherein the transitioning is either (i) dual-radio, in which the WCD switches from using the first radio to be served by the first RAN to using the second radio to be served by the second RAN or (ii) single-radio in which the WCD switches from using the first radio to be served by the first RAN to using the first radio to instead be served by the second RAN; and
   responsive to the transitioning, selecting by the WCD one of at least two IMS transfer-addresses, and sending the selected IMS transfer-address to a network node to trigger IMS transfer of the call from being connected with the WCD via the first RAN to being connected with the WCD via the second RAN, wherein the selecting is based on whether the transitioning is dual-radio or rather single-radio.

2. The method of claim 1, wherein the at least two IMS transfer-addresses comprise a first IMS transfer-address and a second IMS transfer-address, the method further comprising:
  receiving by the WCD one of the first and second IMS transfer-addresses in the course of registering by the WCD with the IMS via the first RAN;
  receiving the other of the first and second IMS transfer-addresses in the course of registering by the WCD with the IMS via a RAN other than the first RAN; and
  maintaining by the WCD both the received first IMS transfer-address and the second received IMS transfer-address concurrently in data storage to facilitate the selecting and sending.

3. The method of claim 2, wherein the first IMS transfer-address is a single radio session transfer number (STN-SR), and wherein the second IMS transfer-address is a voice call continuity domain transfer number (VDN).

4. The method of claim 2, wherein the RAN other than the first RAN is the second RAN.

5. The method of claim 1, wherein the at least two IMS transfer-addresses comprise a first IMS transfer-address and a second IMS transfer-address, the method further comprising:
  receiving by the WCD the first and second IMS transfer-addresses in the course of registering by the WCD with the IMS via the first RAN.

6. The method of claim 1, further comprising correlating by the WCD the first IMS transfer-address with dual-radio transitioning and correlating by the WCD the second IMS transfer-address with single-radio transitioning, to facilitate the selecting and sending.

7. The method of claim 1, wherein the first RAN is an orthogonal frequency division multiple access (OFDMA) cellular RAN, and wherein the second RAN is selected from the group consisting of a code division multiple access (CDMA) RAN, a global system for mobile communications (GSM) RAN, and a wireless local area network (WLAN) RAN.

8. The method of claim 1, wherein the call is a voice call.

9. The method of claim 1,
  wherein if the transitioning is dual-radio, then sending the selected IMS transfer-address to the network node to trigger the IMS transfer of the call from being connected with the WCD via the first RAN to being connected with the WCD via the second RAN comprises sending the selected IMS transfer-address in a Session Initiation Protocol (SIP) RE-INVITE message via the second RAN to an IMS node, wherein the SIP RE-INVITE carrying the selected IMS transfer-address triggers IMS setup of a new leg of the call with the WCD via the second RAN, and
  wherein if the transmitting is single-radio, then sending the selected IMS transfer-address to the network node to trigger the IMS transfer of the call from being connected with the WCD via the first RAN to being connected with the WCD via the second RAN comprises sending the selected IMS transfer-address in an Origination message to a switching center of the second RAN, wherein the Origination message carrying the selected IMS transfer-address triggers bridging of the call between the IMS and the second RAN.

10. A method for hybrid call continuity in a wireless communication device (WCD), the method comprising:
  receiving by the WCD from an Internet Multimedia System (IMS) at least two IMS transfer-addresses, and storing by the WCD the at least two received IMS transfer-addresses concurrently in data storage;
  while the WCD is engaged in a call served by the IMS, transitioning by the WCD from being served by a first radio access network (RAN) that provides connectivity between the WCD and the IMS to being served by a second RAN that provides connectivity between the WCD and the IMS; and
  responsive to the transitioning, (i) selecting by the WCD one of the at least two stored IMS transfer-addresses, and (ii) sending the selected IMS transfer-address to a network node to trigger IMS transfer of the call from being connected with the WCD via the first RAN to being connected with the WCD via the second RAN,
  wherein the WCD has a first radio and a second radio, and wherein the selecting is based on whether the transitioning is (a) dual-radio, in which the WCD switches from using the first radio to be served by the first RAN to using the second radio to be served by the second RAN or rather (b) single-radio in which the WCD switches from using the first radio to be served by the first RAN to using the first radio to instead be served by the second RAN.

11. The method of claim 10,
  wherein the at least two IMS transfer-addresses include a dual-radio-voice-call-continuity (DRVCC) transfer address and a single-radio-voice-call-continuity (SRVCC) transfer address.

12. The method of claim 11, wherein the first RAN is an orthogonal frequency division multiple access (OFDMA) cellular RAN, and wherein the second RAN is selected from the group consisting of a code division multiple access (CDMA) RAN, a global system for mobile communications (GSM) RAN, and a wireless local area network (WLAN) RAN.

13. The method of claim 11,
  wherein if the transitioning is dual-radio, then sending the selected IMS transfer-address to the network node to trigger the IMS transfer of the call from being connected with the WCD via the first RAN to being connected with the WCD via the second RAN comprises sending the selected IMS transfer-address in a Session Initiation Protocol (SIP) RE-INVITE message via the second RAN to an IMS node, wherein the SIP RE-INVITE carrying the selected IMS transfer-address triggers IMS setup of a new leg of the call with the WCD via the second RAN, and
  wherein if the transmitting is single-radio, then sending the selected IMS transfer-address to the network node to trigger the IMS transfer of the call from being connected with the WCD via the first RAN to being connected with the WCD via the second RAN comprises sending the selected IMS transfer-address in an Origination message to a switching center of the second RAN, wherein the Origination message carrying the selected IMS transfer-address triggers bridging of the call between the IMS and the second RAN.

14. A wireless communication device (WCD) supporting hybrid call continuity, the WCD comprising:
  a wireless communication interface comprising a first radio and a second radio;
  data storage; and
  a controller,
  wherein the controller is configured to receive from an Internet Multimedia Subsystem (IMS) two IMS transfer-addresses including a dual-radio-voice-call-continuity (DRVCC) transfer address and a single-radio-voice-call-continuity (SRVCC) transfer address, and to store the received IMS transfer-addresses in the data storage, wherein the controller is further configured to carry out hybrid call continuity operations while the WCD is engaged in a call served by the IMS, the operations comprising (i) detecting transitioning of the WCD from being served by a first radio access network (RAN) that provides connectivity between the WCD and the IMS to being served by a second RAN that provides connectivity between the WCD and the IMS, and (ii) responsive to the detecting, selecting one of the stored IMS transfer-addresses and sending the selected IMS transfer-address via the wireless communication interface to a network node to trigger IMS transfer of the call from being connected with the WCD via the first RAN to being connected with the WCD via the second RAN, and wherein the selecting is based on whether the transitioning is dual-radio, in which the WCD switches from using the first radio to be served by the first RAN to using the second radio to be served by the second RAN, or is rather single-radio, in which the WCD switches from using the first radio to be served by the first RAN to using the first radio to instead be served by the second RAN.

15. The WCD of claim 14, wherein the controller is integrated with the wireless communication interface.

16. The WCD of claim 14, wherein the controller is configured to receive the two IMS transfer-addresses in the course of one or more registrations of the WCD with the IMS.

17. The WCD of claim 14, wherein the controller is further configured to correlate the first IMS transfer-address with dual-radio transitioning and the second IMS transfer-address with single-radio transitioning, to facilitate the selecting and sending.

18. The WCD of claim 14, wherein the first RAN is an orthogonal frequency division multiple access (OFDMA) cellular RAN, and wherein the second RAN is selected from the group consisting of a code division multiple access (CDMA) RAN, a global system for mobile communications (GSM) RAN, and a wireless local area network (WLAN) RAN.

19. The WCD of claim 14, wherein the call is a voice call.

20. The WCD of claim 14, wherein if the transitioning is dual-radio, then sending the selected IMS transfer-address to the network node to trigger the IMS transfer of the call from being connected with the WCD via the first RAN to being connected with the WCD via the second RAN comprises sending the selected IMS transfer-address in a Session Initiation Protocol (SIP) RE-INVITE message via the second RAN to an IMS node, wherein the SIP RE-INVITE carrying the selected IMS transfer-address triggers IMS setup of a new leg of the call with the WCD via the second RAN, and wherein if the transmitting is single-radio, then sending the selected IMS transfer-address to the network node to trigger the IMS transfer of the call from being connected with the WCD via the first RAN to being connected with the WCD via the second RAN comprises sending the selected IMS transfer-address in an Origination message to a switching center of the second RAN, wherein the Origination message carrying the selected IMS transfer-address triggers bridging of the call between the IMS and the second RAN.

\* \* \* \* \*